(12) United States Patent
Schultheiss et al.

(10) Patent No.: US 10,801,878 B2
(45) Date of Patent: Oct. 13, 2020

(54) RADAR FILL LEVEL MEASUREMENT DEVICE HAVING A SELF-TESTING FUNCTION

(71) Applicant: VEGA Grieshaber KG, Wolfach (DE)

(72) Inventors: Daniel Schultheiss, Hornbergand (DE); Christoph Mueller, Oppenau (DE)

(73) Assignee: VEGA Grieshaber KG, Wolfach (DE)

( * ) Notice: Subject to any disclaimer, the term of this patent is extended or adjusted under 35 U.S.C. 154(b) by 436 days.

(21) Appl. No.: 15/635,918

(22) Filed: Jun. 28, 2017

(65) Prior Publication Data

US 2018/0003542 A1 Jan. 4, 2018

(30) Foreign Application Priority Data

Jun. 29, 2016 (DE) .................. 10 2016 211 764

(51) Int. Cl.
*G01F 25/00* (2006.01)
*G01S 7/35* (2006.01)
(Continued)

(52) U.S. Cl.
CPC ........ *G01F 25/0076* (2013.01); *G01F 23/284* (2013.01); *G01S 7/35* (2013.01);
(Continued)

(58) Field of Classification Search
CPC .... G01F 25/0076; G01F 23/284; G01F 22/00; G01S 7/35; G01S 7/4008; G01S 7/4021;
(Continued)

(56) References Cited

U.S. PATENT DOCUMENTS 9,683,882 B2 6/2017 Gerding et al.
2015/0276462 A1* 10/2015 Kleman .............. G01F 25/0076
342/124

(Continued)

FOREIGN PATENT DOCUMENTS

DE 102014107249 11/2015
DE 102014109120 12/2015
WO WO 2015/176889 11/2015

OTHER PUBLICATIONS

German Search Report dated May 22, 2017 for German Patent Application No. DE 102016211764.5.

*Primary Examiner* — Erin F Heard
*Assistant Examiner* — Michael W Justice
(74) *Attorney, Agent, or Firm* — Hunton Andrews Kurth LLP

(57) ABSTRACT

An exemplary fill level measurement device comprising a radar module can be provided, along with method, computer-executable instructions and computer-readable medium. The radar module can comprise a receiving channel for receiving a radar signal reflected by a filling medium. The fill level measurement device can also comprise a test module for testing the functionality of the receiving channel. The test module can comprise a test input (for feeding in a test signal having a test frequency, and a feeding-in apparatus configured to feed at least part of the test signal into the receiving channel. The feeding-in apparatus can be configured to superpose and/or combine the test signal with the radar signal reflected by the filling medium. The receiving channel of the radar module can further comprise a mixing device having an intermediate frequency output. The mixing device can be configured to output the test frequency of the test signal at the intermediate frequency output when the receiving channel is functioning correctly.

14 Claims, 2 Drawing Sheets

(51) Int. Cl.
*G01S 7/40* (2006.01)
*G01S 13/88* (2006.01)
*G01F 23/284* (2006.01)

(52) U.S. Cl.
CPC .......... *G01S 7/4008* (2013.01); *G01S 7/4021* (2013.01); *G01S 13/88* (2013.01); *G01S 2007/4069* (2013.01)

(58) Field of Classification Search
CPC .. G01S 13/88; G01S 2007/4069; G01S 7/292; G01S 7/487; G01S 7/52004; G01S 7/526; G01S 7/536; G01S 15/34; G01S 15/354; G01S 15/4021; G01S 15/493; G01S 15/497; G01S 13/34; G01S 17/325; G01S 7/03; G01S 7/41; G01S 13/0209; G01S 13/10; G01S 13/085; H04B 17/0085; H04B 17/15
See application file for complete search history.

(56) References Cited

U.S. PATENT DOCUMENTS

2016/0087734 A1* 3/2016 Kordik ............... H04B 17/0085
　　　　　　　　　　　　　　　　　　455/67.14
2017/0090014 A1* 3/2017 Subburaj ............... G01S 13/931

* cited by examiner

RADAR FILL LEVEL MEASUREMENT DEVICE HAVING A SELF-TESTING FUNCTION

CROSS-REFERENCE TO RELATED APPLICATION(S)

This application claims the benefit of and priority from German Patent Application No. 10 2016 211 764.5 filed on 29 Jun. 2016, the entire content and disclosure of which is incorporated herein by reference.

FIELD OF THE DISCLOSURE

The present disclosure generally relates to the field of radar-based fill level measurements, and in particular to a fill level measurement device comprising a radar module, a method for testing the functionality of a fill level measurement device, a program element stored on an electronic storage medium for a fill level measurement device, and a non-transitory computer-readable medium comprising such exemplary program element.

BACKGROUND INFORMATION

Radar-based fill level measurement devices generally comprise a radar module that may be implemented as an integrated radar component or electronic radar component, in particular as a high-frequency chip, for example.

In order to test the functional efficiency and/or functionality of the radar module in a fill level measurement device, a high-frequency output signal of the radar module may be measured, for example. A test measurement may also be carried out in a known environment using the fill level measurement device, in which environment the expected echo signals are known and may be reproduced provided the fill level measurement device or radar module is functioning correctly. The radar module may also be indirectly tested using monitoring the current consumption of the radar module.

OBJECTS AND SUMMARY OF THE PRESENT DISCLOSURE

An exemplary object of the present disclosure is to provide a fill level measurement device comprising a reliable radar module, the functionality of which can be tested in a simple manner, and a corresponding radar module for a fill level measurement device.

This exemplary object is achieved by the features of the subject matter described and/or claimed herein.

One exemplary embodiment of the present disclosure relates to a fill level measurement device comprising a radar module. The exemplary fill level measurement device and/or the radar module can comprise a receiving channel for receiving a radar signal reflected by a filling medium and/or a filling material and a test module for testing the functionality of the receiving channel. The test module can comprise a test input for feeding in and/or applying a test signal having a test frequency. The test module can further comprise a feeding-in apparatus configured to feed at least part of the test signal into the receiving channel. The feeding-in apparatus can denote a feeding-in point and/or a feeding-in element in the receiving channel in this case. For example, the feeding-in apparatus can comprise a coupler, a power distributor and/or a combiner. As another example, some of the power of the test signal may be fed into the receiving channel using the feeding-in apparatus, and may be superposed by and/or combined with the radar signal reflected by the filling medium in this case.

The receiving channel of the radar module can comprise a mixing device and/or mixer having an intermediate frequency output. The mixing device may be coupled to the feeding-in apparatus in this case, e.g., it may be directly or indirectly connected to the feeding-in apparatus using additional components or circuit parts. For example, an output of the feeding-in apparatus may be connected to an input of the mixing device. In this exemplary case, the mixing device can be configured to output the test frequency of the test signal at the intermediate frequency output when the receiving channel is functioning correctly.

The receiving channel can denote, for example, a receiver of the fill level measurement device or the radar module that is coupled to an antenna of the fill level measurement device, and the test module can denote a test arrangement and/or a test apparatus, using which the functionality of the receiving channel may be tested. The term "functionality" can denote, but not limited to, the correct function and/or functionality or error-free functioning of the radar module.

The test input can denote, but not limited to, a connection and/or a port of the radar module. The test signal may be fed into the radar module via the test input, for example, using a frequency generator, it being possible in particular for the test signal to be an analogue signal having a specific test frequency. The test signal can denote, but not limited to, a reference signal and/or a test signal, for example. The test frequency may be variable and/or adjustable in this case. The test frequency may be constant at least during a test procedure. The test frequency of the test signal can have a low frequency in comparison with a transmission signal generated by the fill level measurement device for measuring the fill level.

The mixing device may be used to convert the frequency, and can denote a mixing device that may be used to mix signals having different frequencies.

For example, using the design of the radar module according to an exemplary embodiment of the present disclosure, the fill level measurement device and/or the radar module can therefore advantageously undergo self-testing during continuous operation of the fill level measurement device by applying the test signal to the test input. In particular, the functionality of the receiving channel and/or electronic components of the receiving channel can therefore be tested. To contrast, in conventional test methods, special measurements and/or test modes are carried out, during which the normal measurement function of the fill level measurement device may be influenced and/or interrupted.

Furthermore, an application of the test signal and evaluating a transmission signal or output signal generated by the radar module can take place in the low-frequency range. Furthermore, the radar module may be advantageously tested without additional actions, such as measurement superstructures and/or measurement devices, the actual test not influencing the function of the fill level measurement device. In other words, the useful signal, such as the reflected radar signal, and the test signal may be evaluated at the same time, it being possible for the test signal to correspond to an artificially generated echo signal and/or to a reference echo.

According to one exemplary embodiment of the present disclosure, the fill level measurement device or the radar module comprises a transmission channel for transmitting a transmission signal, the transmission channel comprising an oscillator for generating an oscillator signal. The oscillator can in particular be a voltage-controlled oscillator, and the transmission signal can denote an output signal and/or output radar signal, which may be emitted and/or output by the fill level measurement device in order to determine a fill level.

According to another exemplary embodiment of the present disclosure, the test module comprises a test mixing device and/or a test mixer for converting the frequency, said test mixing device being configured to mix the oscillator signal from the oscillator with the test signal and/or to add it thereto. The test mixing device comprises a first input in this case, which is connected to the test input of the test module, and a second input, which is connected to an output of the oscillator. In this way, the test signal coupled in via the test input may be superposed by the oscillator signal. The functionality of the oscillator can therefore also be tested.

According to yet another exemplary embodiment of the present disclosure, the test module can comprise a first amplifier, the output of the oscillator being connected to the second input of the test module using the first amplifier. In other words, the oscillator signal may be amplified by the first amplifier and can then be fed into the test mixing device.

According to still another exemplary embodiment of the present disclosure, the test module can comprise a second amplifier, an output of the test mixing device being connected to the feeding-in apparatus and/or to a feeding-in point in the receiving channel using the second amplifier. The second amplifier can, in particular, be a variable amplifier that may be used to further amplify the test signal mixed with the oscillator signal.

According to a further exemplary embodiment of the present disclosure, the oscillator can comprise an additional output, which is connected to the mixing device of the receiving channel using an amplifier, for example a local oscillator buffer. When the oscillator, the amplifier and the test mixing device are functioning correctly, the test frequency of the test signal can thus be output at the intermediate frequency output, by which the functionality of said electronic components may be advantageously tested.

According to a still further exemplary embodiment of the present disclosure, the transmission channel of the radar module can further comprise a transmission amplifier for amplifying the oscillator signal and for generating the transmission signal. The transmission amplifier can in particular be a variable transmission amplifier, and therefore the transmission signal may be adapted or adjusted so as to vary the power thereof.

In another exemplary embodiment of the present disclosure, the test module can further comprise a power detector for testing the transmitting power of the transmission channel. The power detector may be connected to the transmission channel and/or to the transmission amplifier of the transmission channel using an additional coupler, combiner and/or power distributor, for example. In this way, some of the power of the transmission signal may be coupled out of the transmission channel using the power distributer, and the coupled-out power may be determined.

According to yet another exemplary embodiment of the present disclosure, the radar module is a high-frequency radar module and/or the radar module can be configured to generate a transmission signal having a transmission frequency that is greater than or equal to 24 GHz. The radar module may also be configured to generate a transmission signal having a transmission frequency that is greater than or equal to 80 GHz. The transmission frequency may also be at least 100 GHz. In general, the transmission frequency can denote an output frequency of the fill level measurement device.

In to still another exemplary embodiment of the present disclosure, the test frequency of the test signal can be at least one order of magnitude smaller than a transmission frequency of a transmission signal from the radar module. Alternatively or in addition, the test frequency of the test signal is between 1 kHz and 100 MHz. For example, a transmission frequency of the transmission signal may be 80 GHz and the test frequency may be approximately 100 kHz.

According to a further other exemplary embodiment of the present disclosure, the test module, the transmission channel and the receiving channel may be formed in a common radar chip together with the mixing device. This can make it possible to provide a low-cost compact radar chip or a low-cost compact radar module.

In another exemplary aspect of the present disclosure, a radar module can be provided for a fill level measurement device as described above and below. Features and elements of the fill level measurement device may be features and elements of the radar module, and vice versa.

According to yet another exemplary aspect of the present disclosure, a method can be provided for testing the functionality of a receiving channel of a fill level measurement device. The exemplary method can comprise receiving, e.g., using a receiving channel of a radar module of the fill level measurement device, a radar signal reflected by an object, and applying a test signal having a test frequency to a test input of a test module of the radar module. In another exemplary step and/or procedure, at least part of the test signal and at least part of the radar signal can be combined to form a combined signal, for example, using a feeding-in apparatus of the test module. Furthermore, the combined signal can be fed into a mixing device, which can comprise an intermediate frequency output. Before feeding the combined signal into the mixing device, the combined signal can optionally be amplified using a low-noise amplifier (LNA). The test frequency of the test signal is lastly output at the intermediate frequency output in order to test the functionality of the receiving channel.

Features and elements of the exemplary radar module or the fill level measurement device described herein may be features and/or steps of the method described above and below. Likewise, features and/or steps of the method may be features and elements of the radar module or of the fill level measurement device.

In a further exemplary aspect of the present disclosure, a program element can be provided which is stored on an electronic storage arrangement, which, when executed on a computer processor unit and/or a processor of a fill level measurement device, can instruct the fill level measurement device to carry out the steps and/or procedures of the method described herein.

According to a still further exemplary aspect of the present disclosure, a non-transitory computer-readable medium on which a program element is stored can be provided. For example, the program element, when executed on a processor unit and/or a processor of a fill level measurement device, instructs the fill level measurement device to carry out the steps and/or procedures of the method described herein.

Each and every exemplary embodiment and aspect described herein, and their components, portions, configurations, procedures and procedures can be performed, combined and interchanged with one or more of other exemplary embodiments and aspects described herein.

These and other objects, features and advantages of the exemplary embodiments of the present disclosure will become apparent upon reading the following detailed description of the exemplary embodiments of the present disclosure, when taken in conjunction with the appended claims.

SUMMARY OF EXEMPLARY EMBODIMENTS

Embodiments of the present disclosure are described in the following with reference to the drawings. In the drawings, the same reference signs can denote elements that are identical, similar or have the same function.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1A:
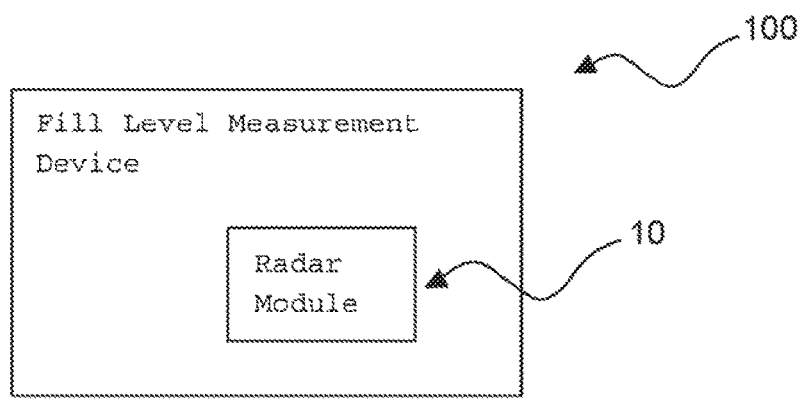
FIG. 1A is a diagram of an exemplary fill level measurement device comprising a radar module according to an exemplary embodiment of the present disclosure.

Throughout the drawings, the same reference numerals and characters, unless otherwise stated, are used to denote like features, elements, components, or portions of the illustrated embodiments. The views in the drawings are merely schematic and are not to scale. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Figure 1B:
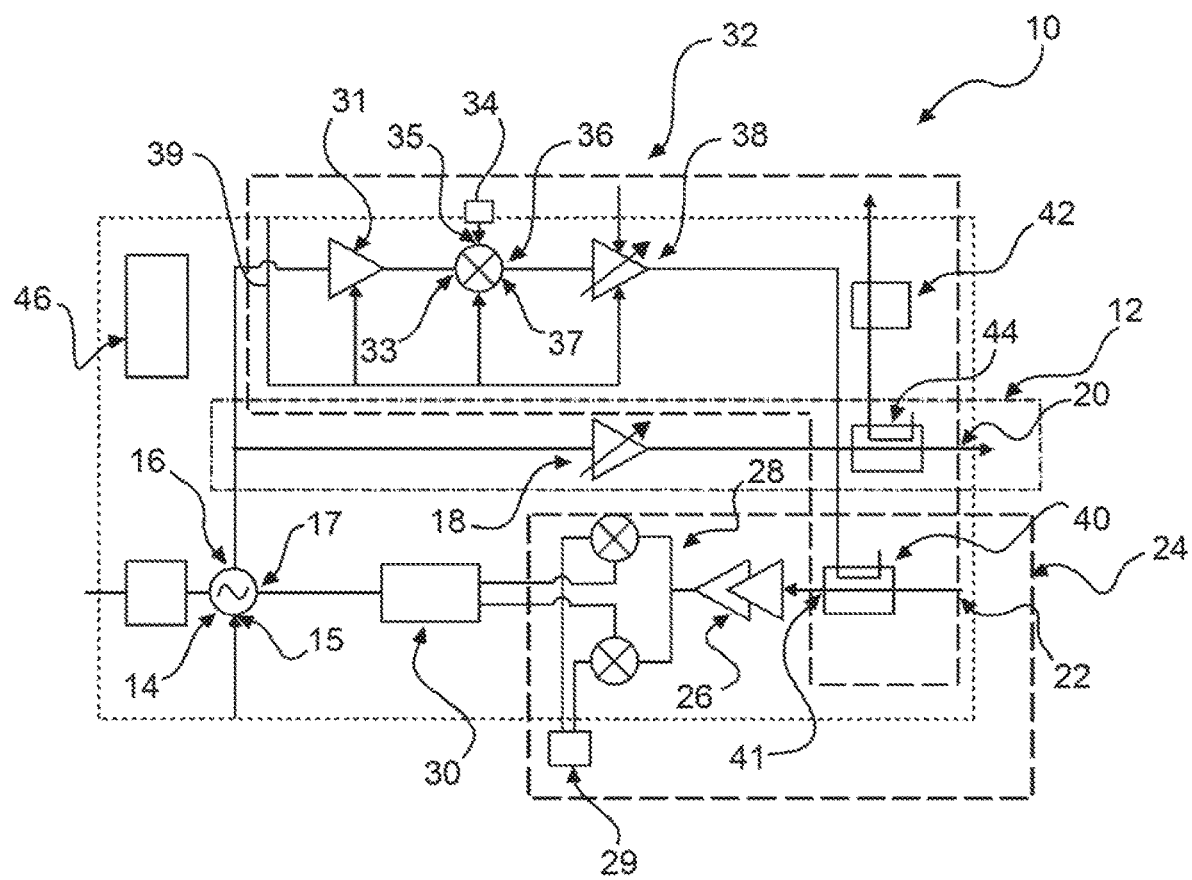
FIG. 1B is a detailed diagram of the radar module shown in FIG. 1A.

FIG. 1A shows a diagram of a fill level measurement device 100 comprising a radar module 10 according to an exemplary embodiment of the present disclosure. FIG. 1B shows a detailed diagram of the radar module 10 illustrated in FIG. 1A.

For example, as shown in FIG. 1B, the radar module 10 can comprise a transmission channel 12 and/or a transmission branch 12 for generating and/or transmitting a radar-based transmission signal. For this purpose, the radar module 10 and/or the transmission channel 12 can comprise an oscillator 14. The oscillator 14 can, in particular, be configured as a voltage-controlled oscillator (VCO) 14, and can generate an oscillator signal on the basis of an amplitude of a control voltage applied to a control input 15. The oscillator signal can have an oscillator frequency in the K band (24 GHz) and in the W band (in particular 80 GHz), and frequencies above 100 GHz.

An output 16 of the oscillator 14 can be connected to a variable amplifier 18 of the transmission branch 12 in order to amplify the power of the oscillator signal. A transmission signal from the radar module 10 can be ultimately generated by the amplifier 18, which signal may be emitted to an output 20 of the radar module 10, for example using an antenna, in order to measure the fill level.

The transmission signal emitted in this exemplary manner can then be reflected by a filling medium, for example. This reflected radar signal can then be coupled to a receiving branch 24 or a receiving channel 24 of the radar module 10 via an input 22 of the radar module 10. The receiving channel 24 of the radar module 10 can generally comprise additional components and/or circuit elements, which are not shown in FIG. 1B, such as, e.g., at least one amplifier.

The reflected radar signal can be fed into a mixing device 28 for converting the frequency using an optional amplifier 26, which may be a low-noise amplifier (LNA) in particular. Another output 17 of the oscillator 14 can be connected to the mixing device 28 using an amplifier 30 (known as a "local oscillator buffer" (LO buffer)), so that the reflected radar signal, e.g., may be mixed with the transmission signal using the mixing device 28, and the actual useful signal containing information relating to the fill level may be output at an intermediate frequency output 29 of the mixing device 28 and further analyzed.

The radar module 10 of the fill level measurement device 100 can further comprise a test module 32 for testing the functionality of the receiving channel 24 and/or of the transmission channel 12. The test module 32 may be considered to be a test apparatus and/or test arrangement and/or a person carrying out the test.

The test module 32 can comprise a test input 34 and/or port 34 and/or connection 34 for feeding in and/or applying a test signal having a test frequency. The test input 32 can be connected to a first input 35 of a test mixing device 36. Alternatively or in addition, the test input 34 can also denote the first input 35 of the test mixing device 36.

Furthermore, the output 16 of the oscillator 14 can be connected to a first amplifier 31 of the test module 32, and the first amplifier 31 can be connected to a second input 33 of the test mixing device 36. The first amplifier 31 can be only optionally provided in this exemplary case. The test mixing device 36 can be configured to mix and/or to add the test signal and the oscillator signal (or the oscillator signal amplified by the first amplifier 31). For example, the oscillator signal can have a frequency of around 80 GHz and the test signal can have a test frequency that is at least one order of magnitude smaller than said oscillator signal. The test frequency can lie in a range of from approximately 1 kHz to approximately 100 MHz, for example.

The test signal mixed with the amplified oscillator signal can be output at an output 37 of the test mixing device 36, and can be fed to a variable second amplifier 38 of the test module 38. The first amplifier 31, the test mixing device 36 and the second amplifier 38 may be controlled, in particular switched on and/or off, using a control signal.

Furthermore, the test module 32 can comprise a feeding-in apparatus 40, such as, e.g., a coupler, a combiner and/or a power distributor, using which at least some of the power of the test signal mixed with the oscillator signal may be fed into the receiving channel 24. An output 41 of the feeding-in apparatus 40 can be connected to the mixing device 28 using the amplifier 26 so that the test frequency of the test signal can be output at the intermediate frequency output 29 when the amplifier 26, the mixing device 28, the amplifier 30 and the oscillator 14 are functioning correctly. In this exemplary way, the functionality of the above-described components may be tested during normal operation of the fill level measurement device 100.

In order to test the transmission power of the radar module 10, the test module can further comprise a power detector 42, which can be connected to an additional coupler 44, combiner 44 and/or power distributor 44, which can be arranged in the transmission branch 12 of the radar module 10, and thus can pick off part of the transmission signal for measuring purposes.

The exemplary function of the test module 32 can be briefly summarized as follows. For example, by applying the test frequency to the test input 34, the test frequency can be output at the intermediate frequency output 29 once again, provided the radar module 10 is functioning correctly. For this to proceed, the oscillator 14, the amplifier 30 and the mixing device 28 should continue functioning "normally". These exemplary components are therefore also should be tested. The transmission amplifier 18 or amplifier 18 may be separately tested by the power detector 42 in the example given. In a distance radar that functions according to the FMCW (frequency-modulated continuous-wave) principle, using this method a type of test echo signal or artificial echo or reference echo signal may be fed in in the form of the test signal. It can be advantageous for the test to be carried out independently of the actual distance measurement. For example, the test signal may be fed in within the measurement range but in an irrelevant frequency range (see FIG. 2A), and/or may be completely outside the measurement range but still in the detection range (see FIG. 2B). Since the artificially generated echo or test frequency of the test signal is known, it is not taken into account for the actual measurement.

By changing the test frequency, the test signal may also be shifted to a measurement range or frequency range that is of no relevance for measuring the fill level. In other words, e.g., the test frequency may be variable and/or adjustable and/or changeable. This exemplary procedure can be carried out or controlled, for example, by a control unit 46 and/or a controller 46 and/or a processor 46 and/or a processor unit 46 of the radar module 10. For example, the control unit 46 may be configured to vary the test frequency automatically such that the reflected radar signal is not interfered with in a frequency range that is relevant for measuring the fill level.

The exemplary structures and/or components and/or functional blocks of the test module 32 may be formed on a common radar chip together with the conventional components of the radar module 10. The components of the test module 32 may also be formed as "built-in self-test" (BIST) structures, for example, which a chip producer for example can use to test the chip during the production process. Alternatively or in addition, the components of the test module 32 may be attached to the outside of the radar module 10 and/or connected thereto. However, this exemplary configuration may be associated with a considerably higher amount of effort and considerable additional costs, since the test structures may have to be inserted into the high-frequency circuit part.

Thus, the function of most or all circuit parts, components and/or elements of the radar module 10 that are arranged between the feeding-in apparatus 40 or feeding-in point of the test signal, e.g., up to and including the mixing device 28, may be tested using the exemplary test method described above or using the test module 32, according to an exemplary embodiment of the present disclosure. Likewise, the functionality of intermediate frequency circuit parts, such as an analogue-digital converter, that are downstream of the mixing device 28 when conducting or processing a signal can, for example, be tested using the test module 32 up until a signal is detected.

Figure 2A:
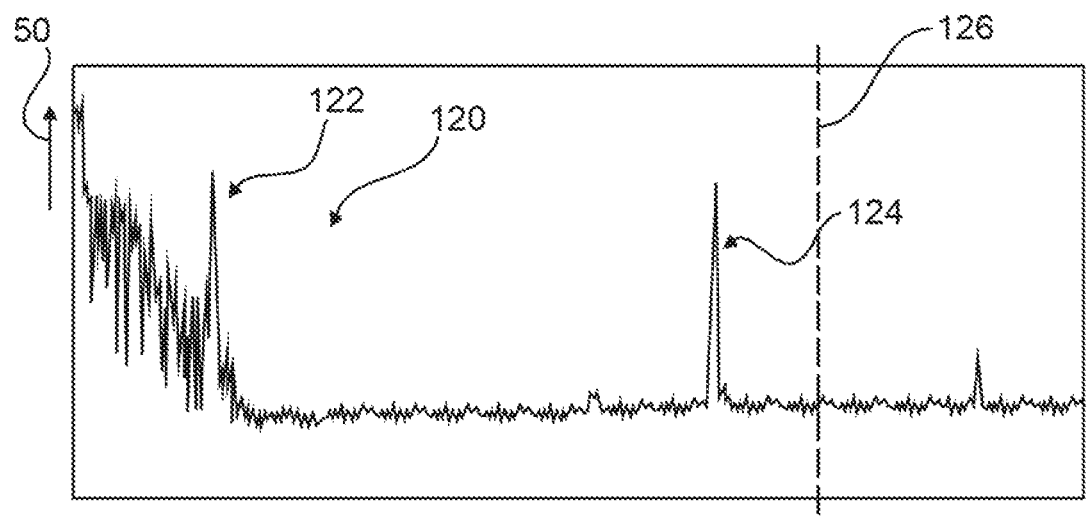
FIGS. 2A and 2B are exemplary echo curves recorded by a fill level measurement device according to an exemplary embodiment of the present disclosure.
Figure 2B:
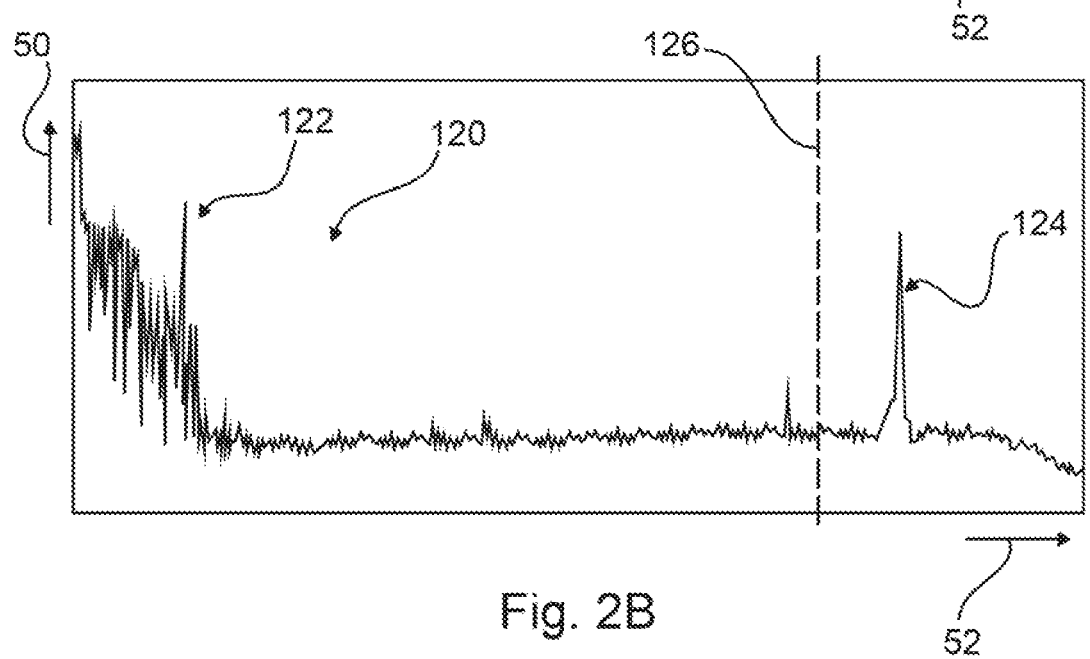

FIGS. 2A and 2B each shows an echo curve 120 recorded by the fill level measurement device 100 according to an exemplary the present disclosure. FIGS. 2A and 2B show, in arbitrary units, an amplitude of the reflected radar signal, which is superposed by the test signal and the test frequency, respectively, as a function of a distance. The illustrated echo curves 120 can, for example, each be echo curves 120 of a W-band fill level measurement device 100.

In the echo curves shown in FIGS. 2A and 2B, the actual fill level signal 122, which is coupled into the receiving channel 24 of the radar module 10 using the input 22, is at comparatively low frequencies or a comparatively short distance. In contrast, the echo 124 or reference echo 124 artificially generated in the form of the test signal lies, at comparatively large distances or frequencies, in a frequency range that is irrelevant for the actual fill level measurement. The measurement range relevant for measuring the fill level lies at frequencies or distances below a measurement range end 126, which is indicated in FIGS. 2A and 2B by a dashed line. For example, the artificial echo 124 for testing the functionality of the receiving channel 24 may be approximately twenty (20) to thirty five (35) meters, although other echoes are possible.

As shown in FIG. 2A, the artificially generated echo 124 or test signal 124 can lie in the measurement range relevant for measuring the fill level, e.g., at lower frequencies than the measurement range end 126. Alternatively or additionally, the artificially generated echo/test signal 124 can lie above the measurement range relevant for measuring the fill level, e.g., at frequencies above the measurement range end 126. The artificial echoes/test signals 124 having different frequencies may also be generated either simultaneously or sequentially.

The artificially generated echo 124 may also be shifted by varying the test frequency. This may be carried out manually and/or automatically, for example using the control unit 46.

Figure 3:
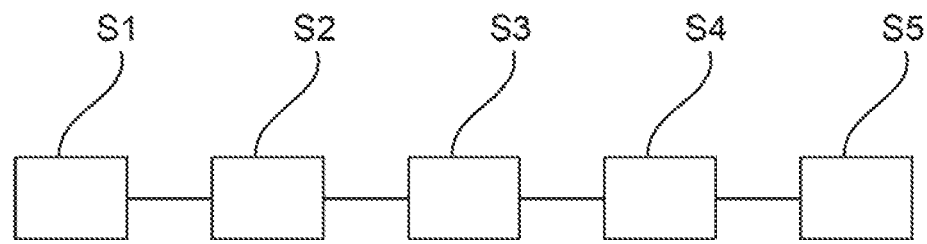
FIG. 3 is an exemplary flow diagram of a method for testing the functionality of a receiving channel of the fill level measurement device according to an exemplary embodiment of the present disclosure.

FIG. 3 shows a flow diagram for illustrating a method for testing the functionality of a receiving channel 24 of a fill level measurement device 100 according to an exemplary embodiment of the present disclosure.

As shown in FIG. 3, in step/procedure S1, a radar signal reflected by a filling medium and/or an object can be received by the receiving channel 24 of a radar module 10 of the fill level measurement device 100. In another step/procedure S2, a test signal having a test frequency can be applied to a test input 34 of a test module 32 of the radar module 10. In step/procedure S3, at least part of the test signal and of the radar signal can be combined to form a combined signal using a feeding-in apparatus 40 of the test module 32. The combined signal may be the reflected radar signal superposed by the test signal and/or test frequency, for example. In step/procedure S4, the combined signal can be fed into a mixing device 28, which can comprise an intermediate frequency output 29. In step/procedure S5, the test frequency of the test signal can be output at the intermediate frequency output 29 in order to test the functionality of the receiving channel 24.

It should be pointed out that "comprising" and "having" do not rule out the possibility of other elements or steps and "one" or "a" does not rule out the possibility of a plurality. Furthermore, it should be pointed out that features or steps described with reference to one of the above embodiments may also be used in combination with other features or steps of other above-described embodiments. Reference signs in the claims should not be considered to be restrictive.

Further, it is noted that the foregoing merely illustrates the exemplary principles of the present disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties, as applicable.

What is claimed is:

1. A fill level measurement device, comprising:
   a radar module including a receiving channel which is configured to receive a radar signal reflected by a filling medium; and
   a test module configured to test a functionality of the receiving channel,
   wherein the test module comprises a test input configured to feed in a test signal having a test frequency,
   wherein the test module comprises a feeding-in apparatus configured to feed at least one part of the test signal into the receiving channel,
   wherein the feeding-in apparatus is configured to at least one of superpose or combine the test signal with the radar signal reflected by the filling medium,
   wherein the receiving channel of the radar module comprises a mixing device having an intermediate frequency output, and
   wherein the mixing device is configured to output the test frequency of the test signal at the intermediate frequency output when the receiving channel is functioning correctly,
   wherein the fill level measurement device further comprises a transmission channel configured to transmit a transmission signal,
   wherein the transmission channel comprises an oscillator configured to generate an oscillator signal,
   wherein the test module comprises a power detector configured to test a transmitting power of the transmission channel, and
   wherein the test frequency of the test signal is at least one order of magnitude smaller than a transmission frequency of a transmission signal from the radar module.

2. The fill level measurement device according to claim 1, wherein the test module comprises a test mixing device that is configured to mix the oscillator signal from the oscillator with the test signal, and
   wherein the test mixing device comprises (i) a first input which is connected to the test input of the test module, and (ii) a second input which is connected to an output of the oscillator.

3. The fill level measurement device according to claim 2, wherein the test module comprises an amplifier, and wherein the output of the oscillator is connected to the second input of the test mixing device using the amplifier.

4. Fill level measurement device according to claim 2, wherein the test module comprises an amplifier, and wherein an output of the test mixing device is connected to a feeding-in apparatus using the amplifier.

5. The fill level measurement device according to claim 1, wherein the oscillator comprises an output which is connected to the mixing device of the receiving channel using an amplifier.

6. The fill level measurement device according to claim 1, wherein the transmission channel of the radar module comprises a transmission amplifier configured to (i) amplify the oscillator signal, and (ii) generate the transmission signal.

7. The fill level measurement device according to claim 1, wherein the radar module is a high-frequency radar module.

8. The fill level measurement device according to claim 1, wherein the radar module is configured to generate a transmission signal having a transmission frequency of at least 24 GHz.

9. The fill level measurement device according to claim 1, wherein the radar module is configured to generate a transmission signal having a transmission frequency is at least 50 GHz.

10. The fill level measurement device according to claim 1, wherein the test frequency of the test signal is between 1 kHz and 100 MHz.

11. The fill level measurement device according to claim 1, wherein the test module and the receiving channel are provided in a common radar chip.

12. A method for testing a functionality of a receiving channel of a fill level measurement device, the method comprising:
    receiving a radar signal reflected by a filling medium using a receiving channel of a radar module of the fill level measurement device, wherein the fill level measurement device further comprises a transmission channel configured to transmit a transmission signal, and wherein the transmission channel comprises an oscillator configured to generate an oscillator signal;
    applying a test signal having a test frequency to a test input of a test module of the radar module, wherein the test module comprises a power detector configured to test a transmitting power of the transmission channel;
    combining at least one part of the test signal and at least one part of the radar signal to form a combined signal;
    feeding the combined signal into a mixing device that comprises an intermediate frequency output; and
    outputting the test frequency of the test signal at the intermediate frequency output so as to test the functionality of the receiving channel, wherein the test frequency of the test signal is at least one order of magnitude smaller than a transmission frequency of a transmission signal from the radar module.

13. A system for testing a functionality of a receiving channel of a fill level measurement device, comprising:
    a computer hardware arrangement configured to:
    receive a radar signal reflected by a filling medium using a receiving channel of a radar module of the fill level measurement device, wherein the fill level measurement device further comprises a transmission channel configured to transmit a transmission signal, and wherein the transmission channel comprises an oscillator configured to generate an oscillator signal;

apply a test signal having a test frequency to a test input of a test module of the radar module, wherein the test module comprises a power detector configured to test a transmitting power of the transmission channel;

combine at least one part of the test signal and at least one part of the radar signal to form a combined signal;

feed the combined signal into a mixing device that comprises an intermediate frequency output; and output the test frequency of the test signal at the intermediate frequency output so as to test the functionality of the receiving channel, wherein the test frequency of the test signal is at least one order of magnitude smaller than a transmission frequency of a transmission signal from the radar module.

14. A non-transitory computer-readable medium having stored thereon computer-executable instructions which, when executed on a processor unit of a fill level measurement device, instruct the fill level measurement device to perform procedures comprising:

receiving a radar signal reflected by a filling medium using a receiving channel of a radar module of the fill level measurement device, wherein the fill level measurement device further comprises a transmission channel configured to transmit a transmission signal, and wherein the transmission channel comprises an oscillator configured to generate an oscillator signal;

applying a test signal having a test frequency to a test input of a test module of the radar module, wherein the test module comprises a power detector configured to test a transmitting power of the transmission channel;

combining at least one part of the test signal and at least one part of the radar signal to form a combined signal;

feeding the combined signal into a mixing device that comprises an intermediate frequency output; and outputting the test frequency of the test signal at the intermediate frequency output so as to test the functionality of the receiving channel, wherein the test frequency of the test signal is at least one order of magnitude smaller than a transmission frequency of a transmission signal from the radar module.

\* \* \* \* \*